(12) United States Patent (10) Patent No.: US 12,586,878 B2
Ishii (45) Date of Patent: Mar. 24, 2026

(54) BATTERY CELL

(71) Applicant: PRIME PLANET ENERGY & SOLUTIONS, INC., Tokyo (JP)

(72) Inventor: Hiroki Ishii, Kakogawa (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 583 days.

(21) Appl. No.: 18/056,021

(22) Filed: Nov. 16, 2022

(65) Prior Publication Data

US 2023/0170591 A1 Jun. 1, 2023

(30) Foreign Application Priority Data

Nov. 30, 2021 (JP) ................................. 2021-194227

(51) Int. Cl.
*H01M 50/593* (2021.01)
*H01M 50/103* (2021.01)
(Continued)

(52) U.S. Cl.
CPC ....... *H01M 50/593* (2021.01); *H01M 50/103* (2021.01); *H01M 50/55* (2021.01); *H01M 50/588* (2021.01)

(58) Field of Classification Search
CPC .. H01M 50/593; H01M 50/103; H01M 50/55; H01M 50/588; H01M 50/105; H01M 50/1245; H01M 50/136; H01M 50/15; H01M 50/176; H01M 50/591; H01M 50/184; H01M 50/198
See application file for complete search history.

(56) References Cited

U.S. PATENT DOCUMENTS

2011/0195301 A1 8/2011 Taniguchi et al.
2013/0034764 A1 2/2013 Ochi et al.
(Continued)

FOREIGN PATENT DOCUMENTS

CN 102916144 A 2/2013
CN 113348574 A 9/2021
(Continued)

OTHER PUBLICATIONS

Hiromichi et al., JP 2019-117740, Espacenet machine translation, 2019 (Year: 2019).*

*Primary Examiner* — Adam A Arciero
(74) *Attorney, Agent, or Firm* — Finnegan, Henderson, Farabow, Garrett and Dunner, LLP

(57) ABSTRACT

A battery cell includes: an electrode assembly; an exterior container; two electrode terminals provided on an upper surface of the exterior container and arranged side by side in a first direction; and an insulating sheet that is in a form of a film and that is provided on the outer surface of the exterior container. The insulating sheet has a folded portion that reaches the upper surface from a short side surface of the exterior container. The folded portion includes a peak portion and valley portions, the peak portion protruding from the short side surface side to the two electrode terminals side along the first direction, the valley portions being located on both sides with respect to the peak portion in a second direction orthogonal to the first direction, each of the valley portions being recessed toward a side away from the two electrode terminals.

13 Claims, 3 Drawing Sheets

(51) Int. Cl.
    *H01M 50/55*      (2021.01)
    *H01M 50/588*    (2021.01)

(56)              References Cited

U.S. PATENT DOCUMENTS

| | | |
|---|---|---|
| 2013/0260197 A1 | 10/2013 | Okada et al. |
| 2014/0106204 A1 | 4/2014 | Tononishi |
| 2017/0047571 A1 | 2/2017 | Iwasaki et al. |
| 2017/0250388 A1 | 8/2017 | Unno et al. |
| 2020/0161600 A1* | 5/2020 | Abe ................... H01M 50/126 |
| 2022/0094020 A1 | 3/2022 | Kasahara et al. |

FOREIGN PATENT DOCUMENTS

| | | |
|---|---|---|
| JP | H 06-028987 U | 4/1994 |
| JP | 2014-063686 A | 4/2014 |
| JP | 2015-228359 A | 12/2015 |
| JP | 2016-015331 A | 1/2016 |
| JP | 2016-139532 A | 8/2016 |
| JP | 2016-154147 A | 8/2016 |
| JP | 2018-028964 A | 2/2018 |
| JP | 2019-117740 A | 7/2019 |
| KR | 10-2014-0047535 A | 4/2014 |
| WO | WO 2016/035395 A1 | 3/2016 |

* cited by examiner

BATTERY CELL

This nonprovisional application is based on Japanese Patent Application No. 2021-194227 filed on Nov. 30, 2021 with the Japan Patent Office, the entire contents of which are hereby incorporated by reference.

BACKGROUND OF THE INVENTION

Field of the Invention

The present technology relates to a battery cell.

Description of the Background Art

There has been conventionally known a battery cell including an insulating film that covers an outer surface of an exterior container having a prismatic shape. Such an insulating film and a battery cell including the insulating film are described, for example, in Japanese Patent Laying-Open No. 2014-63686 and Japanese Patent Laying-Open No. 2016-154147.

SUMMARY OF THE INVENTION

In a step of bringing the insulating film into close contact with the exterior container, the insulating film may be deformed into an unintended shape. For example, when the deformed insulating film protrudes on the upper surface of the exterior container or the like, it is concerned that the deformed insulating film interferes with other components included in the battery module.

An object of the present technology is to provide a battery cell in which an insulating sheet that covers an exterior container is suppressed from interfering with a member located therearound.

A battery cell according to the present technology includes: an electrode assembly; an exterior container that accommodates the electrode assembly and that has a prismatic shape with an outer surface including an upper surface, a long side surface, and a short side surface, two electrode terminals provided on the upper surface of the exterior container and arranged side by side in a first direction; and an insulating sheet that is in a form of a film and that is provided on the outer surface of the exterior container. The insulating sheet has a folded portion that reaches the upper surface from the short side surface of the exterior container. The folded portion includes a peak portion and valley portions, the peak portion protruding from the short side surface side to the two electrode terminals side along the first direction, the valley portions being located on both sides with respect to the peak portion in a second direction orthogonal to the first direction, each of the valley portions being recessed toward a side away from the two electrode terminals.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
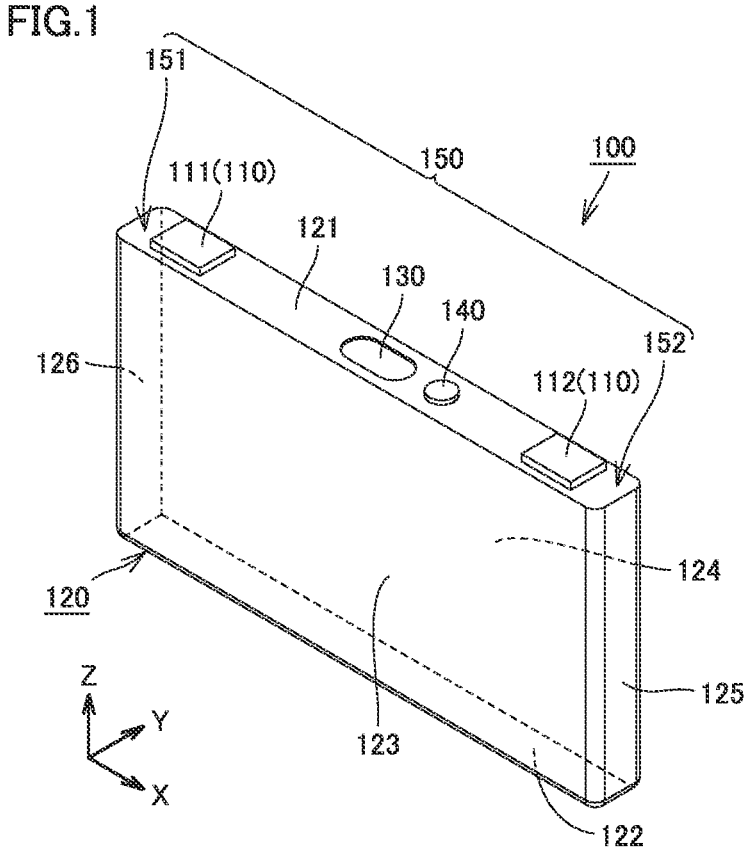
FIG. 1 is a perspective view showing a configuration of a battery cell.

Hereinafter, embodiments of the present technology will be described. It should be noted that the same or corresponding portions are denoted by the same reference characters, and may not be described repeatedly.

It should be noted that in the embodiments described below, when reference is made to number, amount, and the like, the scope of the present technology is not necessarily limited to the number, amount, and the like unless otherwise stated particularly. Further, in the embodiments described below, each component is not necessarily essential to the present technology unless otherwise stated particularly. Further, the present technology is not limited to one that necessarily exhibits all the functions and effects stated in the present embodiment.

It should be noted that in the present specification, the terms "comprise", "include", and "have" are open-end terms. That is, when a certain configuration is included, a configuration other than the foregoing configuration may or may not be included.

Also, in the present specification, when geometric terms and terms representing positional/directional relations are used, for example, when terms such as "parallel", "orthogonal", "obliquely at 45°", "coaxial", and "along" are used, these terms permit manufacturing errors or slight fluctuations. In the present specification, when terms representing relative positional relations such as "upper side" and "lower side" are used, each of these terms is used to indicate a relative positional relation in one state, and the relative positional relation may be reversed or turned at any angle in accordance with an installation direction of each mechanism (for example, the entire mechanism is reversed upside down).

In the present specification, the term "battery" is not limited to a lithium ion battery, and may include another battery such as a nickel-metal hydride battery. In the present specification, the term "electrode" may collectively represent a positive electrode and a negative electrode. Further, the term "electrode plate" may collectively represent a positive electrode plate and a negative electrode plate.

In the present specification, when the terms "power storage cell" or "power storage module" are used, the "power storage cell" or the "power storage module" is not limited to a battery cell or a battery module, and may include a capacitor cell or a capacitor module.

FIG. 1 is a perspective view showing a configuration of a battery cell 100. Battery cell 100 is a lithium ion battery, for example.

As shown in FIG. 1, battery cell 100 includes electrode terminals 110, a housing 120 (exterior container), a gas-discharge valve 130, and an electrolyte solution injection portion 140.

Electrode terminals 110 are formed on housing 120. Electrode terminals 110 have a positive electrode terminal 111 and a negative electrode terminal 112 as two electrode terminals 110 arranged side by side along a first direction (X direction). Positive electrode terminal 111 and negative electrode terminal 112 are provided to be separated from each other in the X direction.

Housing 120 has a rectangular parallelepiped shape (prismatic shape), and forms the external appearance of battery cell 100. An electrode assembly (not shown) and an electrolyte solution (not shown) are accommodated in housing 120. Housing 120 is an exterior container having an upper surface 121, a lower surface 122, long side surfaces 123, 124, and short side surfaces 125, 126. The long side surfaces 123, 124 face each other along a second direction (Y direction) orthogonal to the first direction (X direction).

Electrode terminals 110 are disposed on upper surface 121. Lower surface 122 faces upper surface 121 along the third direction (Z direction) orthogonal to the first direction (X direction) and the second direction (Y direction). Each of upper surface 121 and lower surface 122 is a flat surface orthogonal to the Z direction.

Each of long side surfaces 123, 124 is constituted of a flat surface orthogonal to the Y direction. Each of long side surfaces 123, 124 has the largest area among those of the plurality of side surfaces of housing 120. Each of long side surfaces 123, 124 has a rectangular shape when viewed in the Y direction. Each of long side surfaces 123, 124 has a rectangular shape in which the X direction corresponds to the long-side direction and the Z direction corresponds to the short-side direction when viewed in the Y direction.

A plurality of battery cells 100 are stacked such that long side surfaces 123 of battery cells 100 adjacent to each other in the Y direction face each other and long side surfaces 124 of battery cells 100 adjacent to each other in the Y direction face each other. Thus, positive electrode terminals 111 and negative electrode terminals 112 are alternately arranged in the Y direction in which the plurality of battery cells 100 are stacked.

Gas-discharge valve 130 is provided in upper surface 121. When internal pressure of housing 120 becomes more than or equal to a predetermined value due to gas generated inside housing 120, gas-discharge valve 130 discharges the gas to the outside of housing 120.

Electrolyte solution injection portion 140 is provided on upper surface 121. Electrolyte solution injection portion 140 is provided with an injection hole that extends through upper surface 121 and that communicates with the inside of housing 120, and includes a rivet that closes the injection hole. After the electrolyte solution is injected into housing 120 through the injection hole, the injection hole is closed by the rivet.

Shoulder portions 150 are regions located at upper surface 121 of housing 120 on the outer sides with respect to electrode terminal 110 in the X direction. Shoulder portions 150 include a shoulder portion 151 on the positive electrode terminal 111 side and a shoulder portion 152 on the negative electrode terminal 112 side.

Figure 2:
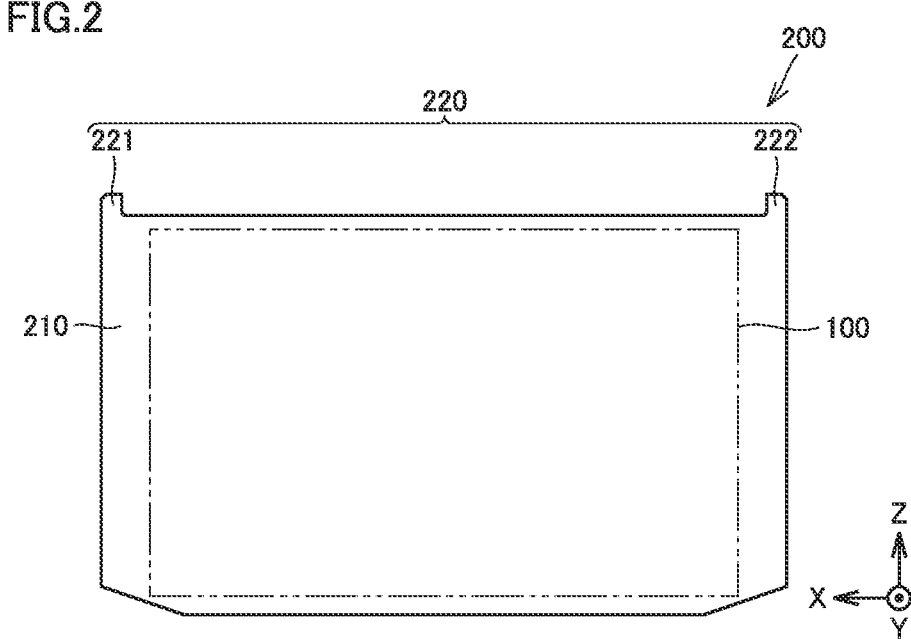
FIG. 2 is a plan view showing an insulating sheet provided on an outer surface of an exterior container.

FIG. 2 is a plan view showing a film 200 (insulating sheet) provided on the outer surface of housing 120. As shown in FIG. 2, film 200 includes a main body portion 210 and protrusions 220 protruding from main body portion 210 in the Z direction. Protrusions 220 include protrusions 221, 222 positioned at both ends in the X direction. Battery cell 100 is accommodated in main body portion 210 that has a shape of pouch. Each of protrusions 220 is folded toward upper surface 121 of housing 120.

Film 200 is a shrink film shrunk by heat. Film 200 can be composed of a PET (polyethylene terephthalate) material having a thickness of, for example, about 0.07 mm.

After battery cell 100 is accommodated in pouch-shaped film 200, an excess portion of film 200 is thermally shrunk by causing it to pass through a shrink furnace. Thus, film 200 is brought into close contact with the outer surface of battery cell 100.

Figure 3:
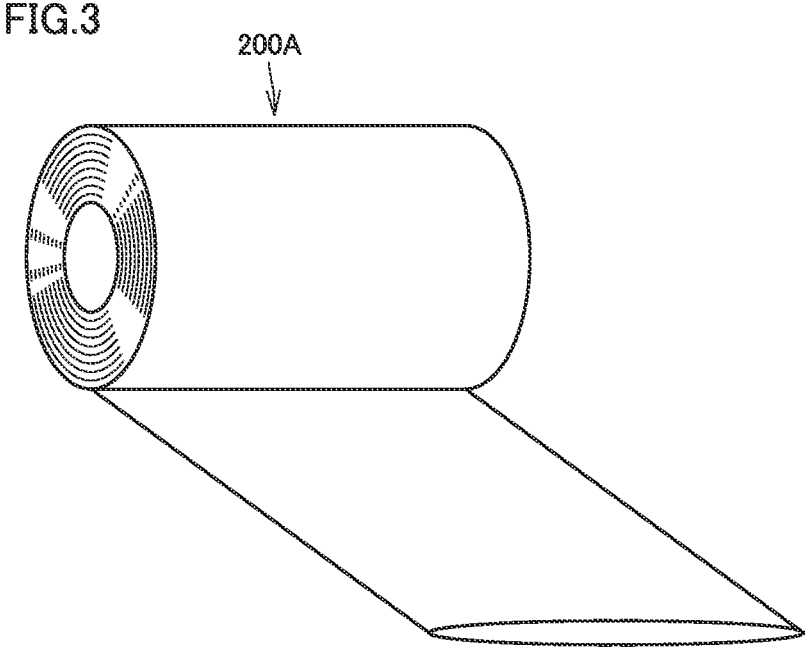
FIG. 3 is a diagram showing a roll of a pouch-shaped sheet material for forming the insulating sheet.

FIG. 3 is a diagram showing a roll 200A of a pouch-shaped sheet material for forming film 200. Pouch-shaped film 200 can be formed by cutting, per predetermined length, roll 200A that is continuous in the Z direction.

Figure 4:
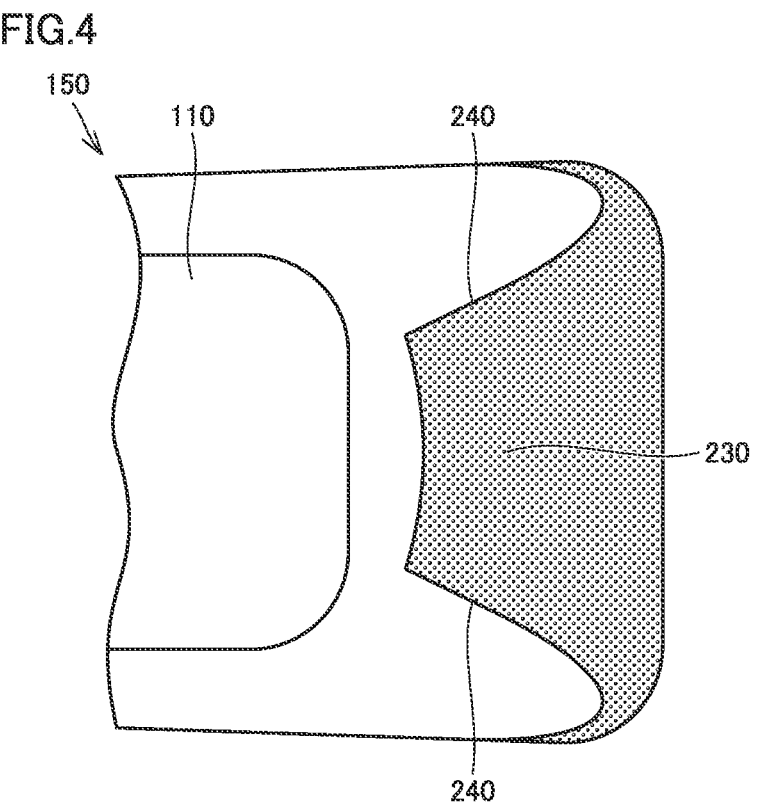
FIG. 4 is a top view showing a shoulder portion of the exterior container.
Figure 5:
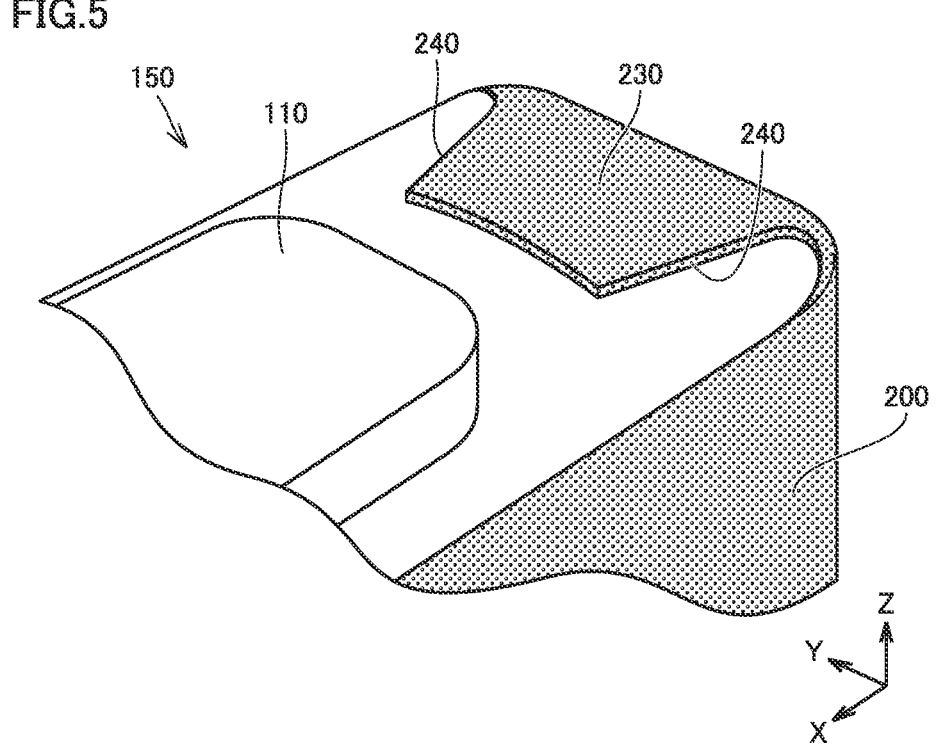
FIG. 5 is a perspective view showing the shoulder portion of the exterior container.

FIG. 4 is a top view showing shoulder portion 150, and FIG. 5 is a perspective view of shoulder portion 150. As shown in FIGS. 4 and 5, film 200 provided on the outer surface of housing 120 is formed to cover long side surfaces 123, 124 and short side surfaces 125, 126 of housing 120. Each of protrusions 220 (folded portions) of film 200 includes a peak portion 230 and valley portions 240, peak portion 230 protruding from the short side surface 125, 126 side to the electrode terminal 110 side along the first direction (X direction), valley portions 240 being located on both sides with respect to peak portion 230 in the second direction (Y direction) orthogonal to the X direction, each of the valley portions 240 being recessed toward a side away from electrode terminal 110. At each of valley portions 240, upper surface 121 is not covered by film 200 and is exposed.

In the example of FIGS. 4 and 5, the contour of the top portion of peak portion 230 has a substantially flat portion along the second direction (Y direction). The expression "substantially flat" does not mean a complete flatness, and also encompasses a case where a slight curvature is included. It should be noted that the top portion of peak portion 230 may be acute. The top portion of peak portion 230 is located at a position separated from electrode terminals 110 along the first direction (X direction).

When film 200 is thermally shrunk, film 200 may be deformed into an unintended shape. For example, when no valley portion 240 (exposed portion) is formed and film 200 is shrunk with film 200 being laid over itself on upper surface 121 of housing 120, it is concerned that deformed film 200 protrudes in the Z direction and interferes with other components (components located therearound) included in the battery module, such as a separator member provided between adjacent battery cells 100.

In order to precisely control the size after the thermal shrinkage, it is considered to form a box-shaped film instead of pouch-shaped film 200 shown in FIG. 2. By forming the box-shaped film, control can be performed more precisely than the control of an amount of insertion of battery cell 100 into main body portion 210 of pouch-shaped film 200. However, it is concerned that the use of such a box-shaped film results in complicated manufacturing process or increased manufacturing cost.

On the other hand, according to film 200 of the present embodiment, since main body portion 210 and protrusions 220 are formed to form valley portions 240 (exposed portions) on both sides with respect to peak portion 230, film 200 is suppressed from being shrunk with film 200 being laid over itself on upper surface 121 of housing 120 of battery cell 100. As a result, film 200 is suppressed from protruding too much unintendedly, thereby suppressing interference with a member located therearound. As a result, a function of the separator between battery cells 100 can be suppressed from being decreased and welding between electrode terminal 110 and a bus bar that electrically connects the plurality of battery cells 100 together can be suppressed from being failed due to a variation in height among the plurality of battery cells 100.

Although the embodiments of the present invention have been described and illustrated in detail, it is clearly understood that the same is by way of illustration and example only and is not to be taken by way of limitation, the scope of the present invention being interpreted by the terms of the appended claims. The scope of the present invention is defined by the terms of the claims, and is intended to include any modifications within the scope and meaning equivalent to the terms of the claims.

What is claimed is:

1. A battery cell comprising:
an electrode assembly;
an exterior container that accommodates the electrode assembly and that has a prismatic shape with an outer surface including an upper surface, a long side surface, and a short side surface;
two electrode terminals provided on the upper surface of the exterior container and arranged side by side in a first direction; and
an insulating sheet that is in a form of a film and that is provided on the outer surface of the exterior container, wherein
the insulating sheet has a folded portion that reaches the upper surface from the short side surface of the exterior container,
the folded portion includes a peak portion and valley portions, the peak portion protruding from the short side surface side to the two electrode terminals side along the first direction, the valley portions being located on both sides with respect to the peak portion in a second direction orthogonal to the first direction, each of the valley portions being recessed toward a side away from the two electrode terminals, and
the insulating sheet is not laid over itself in the peak portion on the outer surface of the exterior container.

2. The battery cell according to claim 1, wherein the insulating sheet is a shrink film shrunk by heat.

3. The battery cell according to claim 1, wherein the insulating sheet at least covers the long side surface and the short side surface of the exterior container.

4. The battery cell according to claim 1, wherein
the insulating sheet is a shrink film shrunk by heat, and
the insulating sheet at least covers the long side surface and the short side surface of the exterior container.

5. The battery cell according to claim 1, wherein a contour of a top portion of the peak portion has a substantially flat portion along the second direction.

6. The battery cell according to claim 5, wherein the top portion is located at a position separated from the two electrode terminals along the first direction.

7. The battery cell according to claim 1, wherein
the insulating sheet is a shrink film shrunk by heat, and
a contour of a top portion of the peak portion has a substantially flat portion along the second direction.

8. The battery cell according to claim 1, wherein
the insulating sheet at least covers the long side surface and the short side surface of the exterior container, and
a contour of a top portion of the peak portion has a substantially flat portion along the second direction.

9. The battery cell according to claim 1, wherein
the insulating sheet is a shrink film shrunk by heat,
the insulating sheet at least covers the long side surface and the short side surface of the exterior container, and a contour of a top portion of the peak portion has a substantially flat portion along the second direction.

10. The battery cell according to claim 1, wherein
the insulating sheet is a shrink film shrunk by heat,
a contour of a top portion of the peak portion has a substantially flat portion along the second direction, and
the top portion is located at a position separated from the two electrode terminals along the first direction.

11. The battery cell according to claim 1, wherein
the insulating sheet at least covers the long side surface and the short side surface of the exterior container,
a contour of a top portion of the peak portion has a substantially flat portion along the second direction, and
the top portion is located at a position separated from the two electrode terminals along the first direction.

12. The battery cell according to claim 1, wherein
the insulating sheet is a shrink film shrunk by heat,
the insulating sheet at least covers the long side surface and the short side surface of the exterior container,
a contour of a top portion of the peak portion has a substantially flat portion along the second direction, and
the top portion is located at a position separated from the two electrode terminals along the first direction.

13. A battery cell comprising:
an electrode assembly;
an exterior container that accommodates the electrode assembly and that has a prismatic shape with an outer surface;
an electrode terminal provided on the outer surface of the exterior container; and
an insulating sheet that is in a form of a film and that is provided on the outer surface of the exterior container, wherein;
the outer surface of the exterior container includes a first surface, a second surface, and a third surface, the first surface is orthogonal to a first direction, the second surface is orthogonal to the first surface, and has a shape in which the first direction corresponds to a long-side direction and a second direction orthogonal to the first direction corresponds to a short-side direction, and the third surface is orthogonal to the first surface and the second surface, and has a larger area than the first surface and the second surface,
the electrode terminal is provided on the second surface,
the insulating sheet has a folded portion that reaches the second surface from the first surface of the exterior container,
the folded portion includes a peak portion and valley portions, the peak portion protruding from the first surface side to the electrode terminal side along the first direction, the valley portions being located on both sides with respect to the peak portion in the second direction, each of the valley portions being recessed toward a side away from the electrode terminal, and
the insulating sheet is not laid over itself in the peak portion on the outer surface of the exterior container.

\* \* \* \* \*